United States Patent
Hakola et al.

(10) Patent No.: US 10,574,326 B2
(45) Date of Patent: Feb. 25, 2020

(54) BEAMFORMED TRANSMISSION IN CELLULAR SYSTEM

(71) Applicant: NOKIA SOLUTIONS AND NETWORKS OY, Espoo (FI)

(72) Inventors: Sami-Jukka Hakola, Kempele (FI); Esa Tapani Tiirola, Kempele (FI)

(73) Assignee: Nokia Solutions and Networks Oy, Espoo (FI)

( * ) Notice: Subject to any disclaimer, the term of this patent is extended or adjusted under 35 U.S.C. 154(b) by 52 days.

(21) Appl. No.: 15/757,930

(22) PCT Filed: Sep. 14, 2015

(86) PCT No.: PCT/EP2015/070926
§ 371 (c)(1),
(2) Date: Mar. 6, 2018

(87) PCT Pub. No.: WO2017/045694
PCT Pub. Date: Mar. 23, 2017

(65) Prior Publication Data
US 2018/0351624 A1 Dec. 6, 2018

(51) Int. Cl.
*H04W 16/28* (2009.01)
*H04B 7/06* (2006.01)
*H04L 1/00* (2006.01)

(52) U.S. Cl.
CPC ......... *H04B 7/0632* (2013.01); *H04B 7/0617* (2013.01); *H04B 7/0695* (2013.01); *H04W 16/28* (2013.01); *H04L 1/0001* (2013.01)

(58) Field of Classification Search
CPC ... H04W 16/28; H04W 72/042; H04W 28/06; H04W 24/08; H04L 5/0007
See application file for complete search history.

(56) References Cited

U.S. PATENT DOCUMENTS

| | | |
|---|---|---|
| 2007/0165736 A1 | 7/2007 | Wang et al. |
| 2013/0170435 A1* | 7/2013 | Dinan .................. H04L 45/50 370/328 |
| 2014/0055302 A1 | 2/2014 | Jia |
| 2014/0098912 A1 | 4/2014 | Yin et al. |
| 2014/0335839 A1* | 11/2014 | Rubin .................. H04W 4/06 455/416 |
| 2016/0275801 A1* | 9/2016 | Kopardekar ......... G08G 5/0043 |

FOREIGN PATENT DOCUMENTS

WO 2014098542 A1 6/2014

OTHER PUBLICATIONS

International Search Report and Written Opinion for International Application No. PCT/EP2015/070926, dated May 17, 2016 (12 pages).

* cited by examiner

*Primary Examiner* — Wei Zhao
(74) *Attorney, Agent, or Firm* — Brake Hughes Bellermann LLP

(57) ABSTRACT

There is provided a solution for efficient communications in a cellular communication system employing beamforming transmissions. In an embodiment, a terminal device (120) carries out the following: scanning for at least one message amongst a plurality of radio beams (112, 114) in a cell (100) according to a search space defining a plurality of scanning configurations; measuring a signal quality of at least one radio beam in the cell; adapting the search space on the basis of the measured signal quality; and performing said scanning for the at least one message according to the adapted search space.

20 Claims, 6 Drawing Sheets

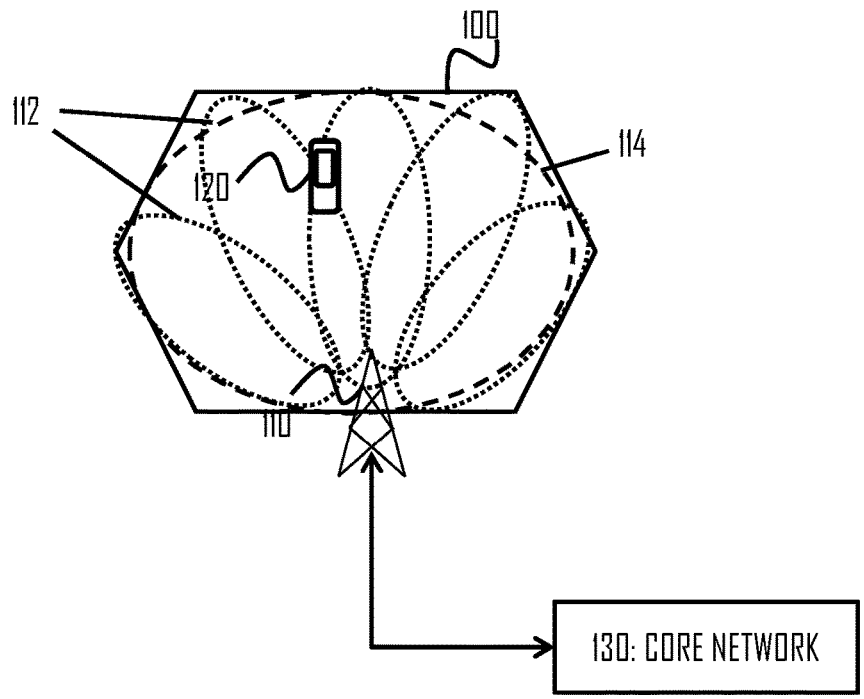
Fig 1
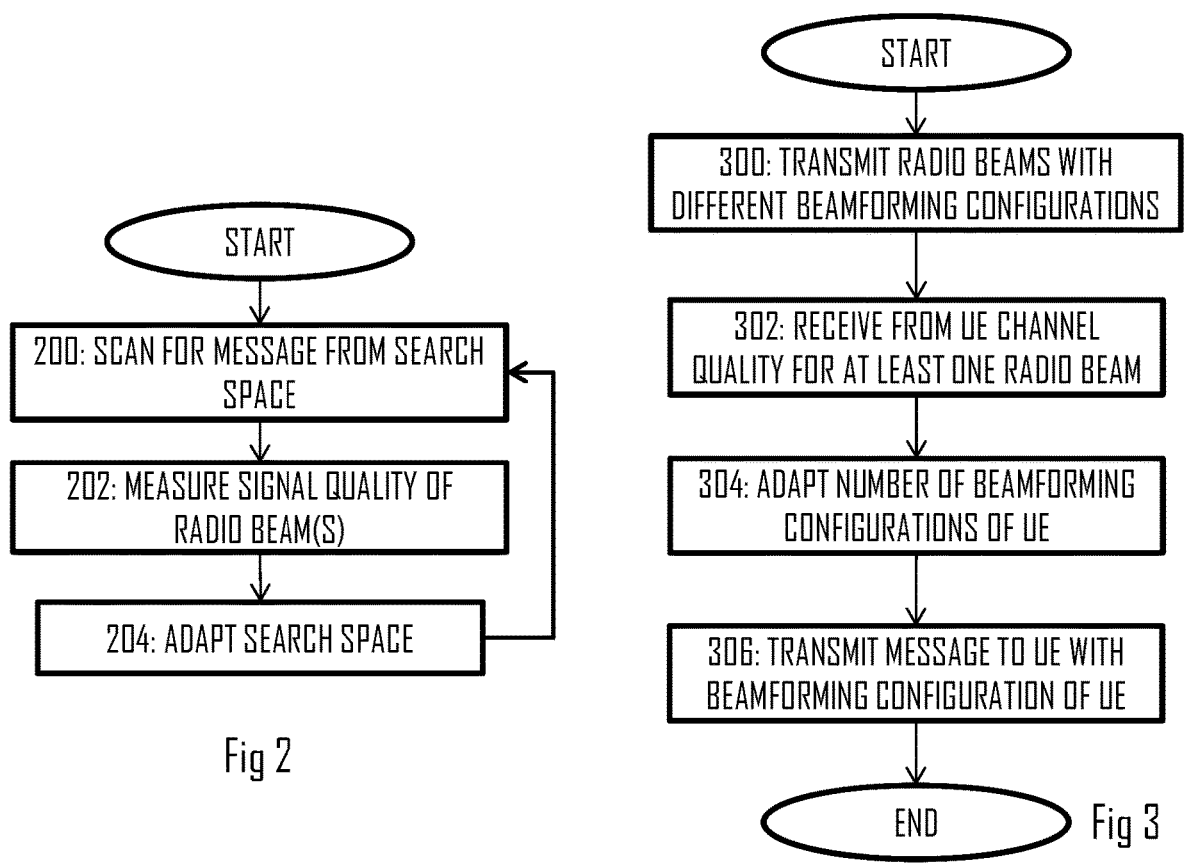
Fig 2
Fig 3

BEAMFORMED TRANSMISSION IN CELLULAR SYSTEM

CROSS-REFERENCE TO RELATED APPLICATIONS

This application is a national stage entry of PCT Application No. PCT/EP2015/070926 filed Sep. 14, 2015, entitled "BEAMFORMED TRANSMISSION IN CELLULAR SYSTEM" which is hereby incorporated by reference in its entirety.

TECHNICAL FIELD

The invention relates to wireless communications in a cellular communication system and, particularly, use of beamforming in transmissions in a cell.

BACKGROUND

Increasing demand for wireless communication services is constantly increasing and, as a result, traffic in cellular communication systems is also increasing. Future cellular systems are expected to operate by using higher frequencies, e.g. frequencies above 3 Gigahertz or even millimeterwaves. Such evolution may require development in transmission techniques.

BRIEF DESCRIPTION

According to an aspect, there is provided the subject matter of the independent claims. Some embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following embodiments will be described in greater detail with reference to the attached drawings, in which FIG. 1 illustrates a wireless communication system to which embodiments of the invention may be applied;

FIGS. 2 and 3 illustrate processes for adapting configurations of radio beam transmissions according to some embodiments of the invention;

DETAILED DESCRIPTION OF SOME EMBODIMENTS

Figure 4:
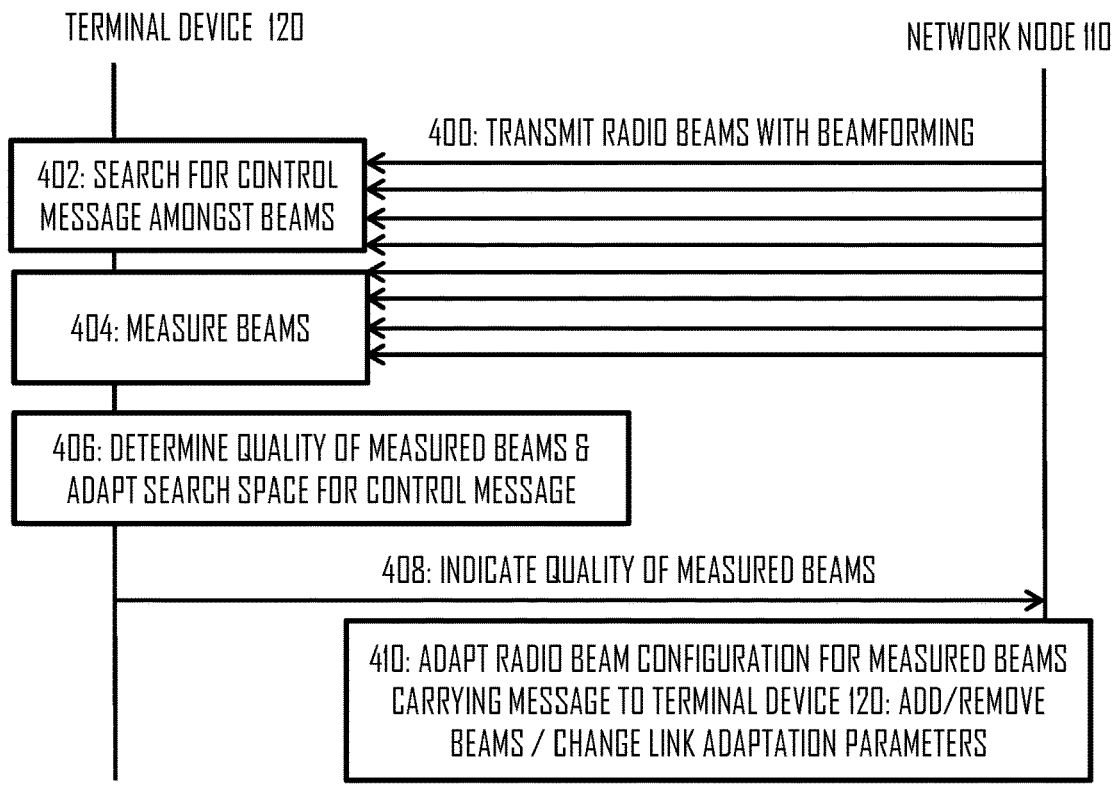
FIGS. 4 and 5 illustrate signaling diagrams for adapting a search space of a terminal device according to some embodiments of the invention.

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as in at least one of the following: Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, and/or 5G system. The present embodiments are not, however, limited to these systems.

The embodiments are not, however, restricted to the system given as an example but a person skilled in the art may apply the solution to other communication systems provided with necessary properties. A 5G system is assumed to use multiple-input-multiple-output (MIMO) antenna techniques, a much higher number of base stations or nodes than the LTE (a so-called small cell concept), including macro sites operating in co-operation with smaller stations and perhaps also employing a variety of radio technologies for better coverage and enhanced data rates. 5G will likely be comprised of more than one radio access technology (RAT), each RAT being optimized for certain use cases and/or spectrum. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-radio-interface operability, such as below 6 GHz—cmWave, below 6 GHz—cmWave—mmWave. One of the concepts considered to be used in 5G networks is network slicing in which multiple independent and dedicated virtual sub-networks (network instances) may be created within the same infrastructure to run services that have different requirements on latency, reliability, throughput and mobility. It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

Some embodiments of the present invention may be applied to a cellular communication system applying beamforming to transmissions in a cell. FIG. 1 illustrates an example of such a cellular communication system. Cellular radio communication networks, such as the Long Term Evolution (LTE), the LTE-Advanced (LTE-A) of the 3$^{rd}$ Generation Partnership Project (3GPP), or the predicted future 5G solutions, are typically composed of at least one network element, such as a network node 110, providing a cell 100. The cell 100 may be, e.g., a macro cell, a micro cell, femto, or a pico-cell, for example. The network node 110 may be an evolved Node B (eNB) as in the LTE and LTE-A, a radio network controller (RNC) as in the UMTS, a base station controller (BSC) as in the GSM/GERAN, or any other apparatus capable of controlling radio communication and managing radio resources within the cell 100. For 5G solutions, the implementation may be similar to LTE-A, as described above. The network node 110 may be a base station or an access node. The cellular communication system may be composed of a radio access network of network nodes similar to the network node 110, each controlling a respective cell or cells.

The network node 110 may be further connected via a core network interface to a core network 130 of the cellular communication system. In an embodiment, the core network 130 may be called Evolved Packet Core (EPC) according to the LTE terminology. The core network 130 may comprise a mobility management entity (MME) and a data routing network element 134. In the context of the LTE, the MME tracks mobility of the terminal devices 120 and carries out establishment of bearer services between the terminal devices 120 and the core network 130. In the context of the LTE, the data routing network element may be called a System Architecture Evolution Gateway (SAE-GW). It may be configured to carry out packet routing to/from the terminal devices 120 from/to other parts of the cellular communication system and to other systems or networks, e.g. the Internet.

As described above, the network node 110 may employ beamforming in transmission of radio signals in the cell 100. As known in the field of wireless communications, beamforming also called spatial filtering refers to directional transmission or reception. The steering of a radio beam may be achieved through digital and/or analog signal processing techniques and use of multiple antenna elements forming an antenna array. For example, the steering may be achieved by combining elements in a phased antenna array in such a way that signals at particular angles experience constructive interference while others experience destructive interference. Beamforming can be used in a transmitter and/or in a receiver in order to achieve spatial selectivity. The spatial selectivity results in improvement compared with omnidirectional transmission/reception, wherein the improvement is called transmit/receive gain. The network node may employ two types of radio beams: a first type of radio beam 114 that covers substantially the whole cell 100); and a second type of radio beam 112 that covers a portion of the cell 100. When the cell 100 is a sector-type of cell amongst a plurality of sectors established by the network node 110, the first type of radio beam may be called a sector beam. Conventionally, cellular communication systems rely on the first type of radio beams for control plane transmissions (downlink synchronization, broadcast, antenna-port based common reference signals, etc.) and reception (e.g. random access channel, RACH). A system operating on higher carrier frequencies, such as a 5G system, may require higher antenna gain which may be achieved by using radio beams of the second type. In order to support cell sizes with inter-site distance of tens to hundreds meters, both common control and user plane related signalling may utilize radio beams that are narrower than the sector-wide radio beam. The solution is the second type of radio beam.

In some embodiments, the network node may employ the radio beam of the first type in transmission of common control messages. The common control messages may be defined as messages addressed to a plurality of terminal devices or even all terminal devices located in the cell 100. The network node may employ the radio beam(s) of the second type in transmission of terminal-device-specific control messages, e.g. messages addressed to an individual terminal device located in the cell. In some embodiments, the radio beam of the first type may be used in transmission of the terminal-device-specific control messages, and/or the radio beams of the second type may be used in transmission of the common control messages.

Due to transmission power budget or architecture limitations, the network node 110 may have a limited number of radio beams with the desired antenna gain available at a time. It means that the network node 110 may have to perform alternate transmission of the radio beams such that only a subset of the radio beams are active at a time.

The terminal device may scan the channel for a radio beam carrying a message from the network node 110 to the terminal device 120. When the terminal device 120 is dynamically scheduled downlink or uplink data, the terminal device 120 needs to check whether or not there is a scheduling grant transmitted by the network node 110. Link adaptation may be applied to the transmission of the control signalling carrying the scheduling grant to the terminal device. For example, in the LTE system the network node 110 may aggregate control channel elements (CCEs) based on a selected modulation and coding scheme (MCS) by aggregating CCEs by the factor of one, two, four or eight in an open-loop manner. The number of CCEs needed may depend on channel-coding rate which defines the number of transmitted symbols. As the number of CCEs is variable and it may not be signaled by the network node 110, the terminal device may perform blind detection to determine the number of CCEs used for the signalling. In addition, the control channel may have multiple formats and the format is not necessarily known by the terminal device a priori. The number of different configurations for the CCEs or, more generally, a message addressed to the terminal device 120 may define a search space from which the terminal device is scanning for the message. The search space may define scanning configurations for the terminal device 120. Different scanning configurations may define different link adaptation configurations such as candidate MCSs, different radio beams associated with the terminal device, and/or one or more formats of the message. As can be seen, as the number of different variables increases in the search space, the number of different scanning configurations increases exponentially. Accordingly, reduction of the search space may be advantageous. Also, adaptation of the search space to the current operating environment may also be advantageous.

FIGS. 2 and 3 illustrates some embodiments of a process for adapting the search space of the terminal device 120. FIG. 2 illustrates a process for adapting the search space in the terminal device, while FIG. 3 illustrates a process for adapting radio beam configurations associated with the terminal device. Referring to FIG. 2, the process comprises in the terminal device 120: scanning (block 200) for at least one message amongst a plurality of radio beams in a cell according to a search space defining a plurality of scanning configurations; measuring (block 202) a signal quality of at least one radio beam in the cell; adapting (block 204) the search space on the basis of the measured signal quality; and performing said scanning for the at least one message according to the adapted search space.

Referring to FIG. 3, the process comprises in the network node 110: causing (block 300) transmission of a plurality of radio beams in a cell, wherein said plurality of radio beams comprise a plurality of different beamforming configurations; receiving (block 302), from a terminal device 120, a message identifying at least one of the plurality of radio beams and comprising an information element indicating channel quality for each of the identified at least one of the plurality of radio beams; adapting (block 304), on the basis of the received information element for each of the identified at least one of the plurality of radio beams, at least one radio beam configuration associated with the terminal device; and causing (block 306) transmission of a message to the terminal device according to a radio beam configuration currently associated with the terminal device.

In an embodiment, the network node adapts a number of radio beam configurations associated with the terminal device. In an embodiment, the number of radio beam configurations associated with the terminal device in the network node 110 equals to the number of scanning configurations in the search space of the terminal device. The search space and the radio beam configurations may be adapted on the basis of the same criterion or criteria and, accordingly, the flexibility of the network node and the efficiency of the terminal device 120 may be improved.

Adapting the number of radio beam configurations used for transmitting the message to the terminal device 120 enables the terminal device 120 to adapt the search space accordingly. When the number of radio beam configurations available for use in transmissions to the terminal device is reduced, the terminal device 120 may reduce the search space and reduce computational burden and power consumption. On the other hand, increase in the number of radio beam configurations enables the terminal device to increase the search space and provide the network node with more flexibility in allocation of the radio beam configuration for the message.

In an embodiment, said adapting the search space comprises removing at least one link adaptation parameter configuration of at least one radio beam from the search space. In an embodiment, said removing comprises removing at least one modulation-and-coding-scheme configuration of at least one radio beam from the search space.

In another embodiment said adapting the search space comprises removing at least one radio beam from the search space.

In an embodiment, said adapting the search space comprises adding at least one link adaptation parameter configuration to the search space. In an embodiment, said adding comprises adding at least one modulation-and-coding-scheme configuration from the search space.

In another embodiment said adapting the search space comprises adding at least one radio beam from the search space.

In an embodiment, said adapting a radio beam configuration comprises adapting at least one link adaptation parameter configuration of a radio beam. In an embodiment, said adapting comprises adapting at least one modulation-and-coding-scheme configuration of the radio beam. Adapting may comprise changing the MCS for that beam, removing one possible MCS configuration from that beam, or adding a new possible MCS configuration from that beam.

In an embodiment, said adapting the radio beam configuration comprises removing the radio beam from a set of radio beams to which the network node allocates messages addressed to the terminal device.

In an embodiment, said adapting the at least one radio beam configuration comprises adapting the number of radio beam configurations associated with the terminal device. Such adapting may comprise adding at least one link adaptation parameter configuration of at least one radio beam. In an embodiment, said adding comprises adding at least one modulation-and-coding-scheme configuration of the at least one radio beam. In an embodiment, said adapting the number of radio beam configurations comprises increasing the number of radio beams in a set of radio beams to which the network node allocates messages addressed to the terminal device. In such embodiments, the number of radio beam configurations may be considered as a candidate set of radio beam configurations from which the network node may flexibly select a radio beam configuration for each radio beam carrying a message to the terminal device.

In an embodiment, the terminal device may apply a different search space when scanning for the common control messages than when scanning for the terminal-device-specific control messages. For example, the network node may employ more robust link adaptation parameters for the common control messages and, accordingly, the terminal device may use a lower number of different link adaptation configurations in the search space of the common control messages than in the search space of the terminal-device-specific control messages. Beam(s) used for carrying terminal-device-specific messages may also be used for common control signalling where a common control channel and a terminal-device-specific channel may be allocated to different radio resources in time, frequency, space and/or code domain. Common control signalling is typically targeted to all terminal devices in the cell and, thus, a beam used for the transmission may not have optimal beamforming gain towards all targeted UEs. For that reason, the network node may use more robust link adaptation parameter set for the common control signalling than for terminal-device-specific control in connection with the same radio beam. Let us now describe some embodiments of the processes of FIGS. 2 and 3 in the view of communication between the terminal device 120 and the network node 110. FIG. 4 illustrates a signalling diagram according to an embodiment. Referring to FIG. 4, the network node 110 may transmit in step 400 a plurality of radio beams in the cell 100 such that each radio beam is transmitted with a different radio beam configuration. For example, a different beamforming configuration may be applied to each radio beam. The radio beams may comprise at least one radio beam of the second type (beamformed radio beam). Step 400 may be an embodiment of block 300. The radio beams may in some embodiments comprise at least one radio beam of the first type, covering the whole cell 100.

In block 402, the terminal device 120 may scan for a message, e.g. a control message, amongst the radio beams. The terminal device 120 may apply scanning configurations defined by the search space in the scanning (see block 200). For example, the terminal device may scan for a determined radio beam comprised in the search space. As another example, the terminal device 120 may attempt reception with a plurality of different link adaptation parameter configurations comprised in the search space, e.g. different MCS configurations. When processing a received signal according to a determined link adaptation parameter configuration, the terminal device 120 may perform an error correction check (e.g. cyclic redundancy check, CRC). If the error correction check indicates correct reception, the terminal device may determine that the message has been discovered and forward the message for extraction. The terminal device may also end the scanning or start scanning for a next message. On the other hand, if the error correction check indicates erroneous reception, the terminal device may attempt reception with a different configuration. In this manner, the terminal device may perform blind detection of the message in the search space.

In block 404, the terminal device measures the radio beams the terminal device is capable of receiving. The measurement of block 404 may be applied to radio beam(s) comprised in the search space and, in some embodiments, even to a radio beam that is not comprised in the search space. The terminal device 120 may measure a received signal strength indicator (RSSI) for each radio beam, or it may measure another metric indicating reception quality of the radio beam or channel state between the network node 110 and the terminal device 120. In block 406, the terminal device may determine the signal quality of measured beams and adapt the search space according to the determined signal quality. Block 406 may thus be considered as an embodiment of block 204. In the embodiment of FIG. 4, the terminal device performs the adaptation of the search space autonomously on the basis of the signal quality of the radio beams. The terminal device 120 may, however, transmit to the network node 110 a message identifying the at least one measured radio beam and comprising an information element indicating the signal quality for the at least one measured radio beam (block 408).

Upon receiving the message in step 408, the network node may adapt, on the basis of the received information element for each of the identified at least one of the plurality of radio beams, the radio beam configurations associated with the terminal device (block 410). For example, if a signal quality of a radio beam is below a determined threshold, the network node 110 may remove the radio beam from a set of radio beams associated with the terminal device. From another perspective, the network node may switch the radio beam configuration of the radio beam off. On the other hand, if a signal quality of a radio beam not comprised in the radio beam configuration associated with the terminal device exceeds the threshold or another threshold, the network node may add such a beam to the set of radio beams associated with the terminal device. From another perspective, the network node may switch the radio beam configuration of the radio beam on. As another example, the network node may adapt the radio beam configuration of a radio beam by selecting link adaptation parameters for the radio beam on the basis of the received signal quality.

The embodiment of FIG. 4 enables common understanding of the channel between the terminal device 120 and the network node for each measured radio beam. Accordingly, the network node may select a radio beam configuration appropriate to the channel, and the terminal device may adapt the search space such that the search space is mapped to the selected radio beam configuration. Some embodiments of how the mapping is realized are described below in connection with FIG. 6 and Table 1.

Figure 5:
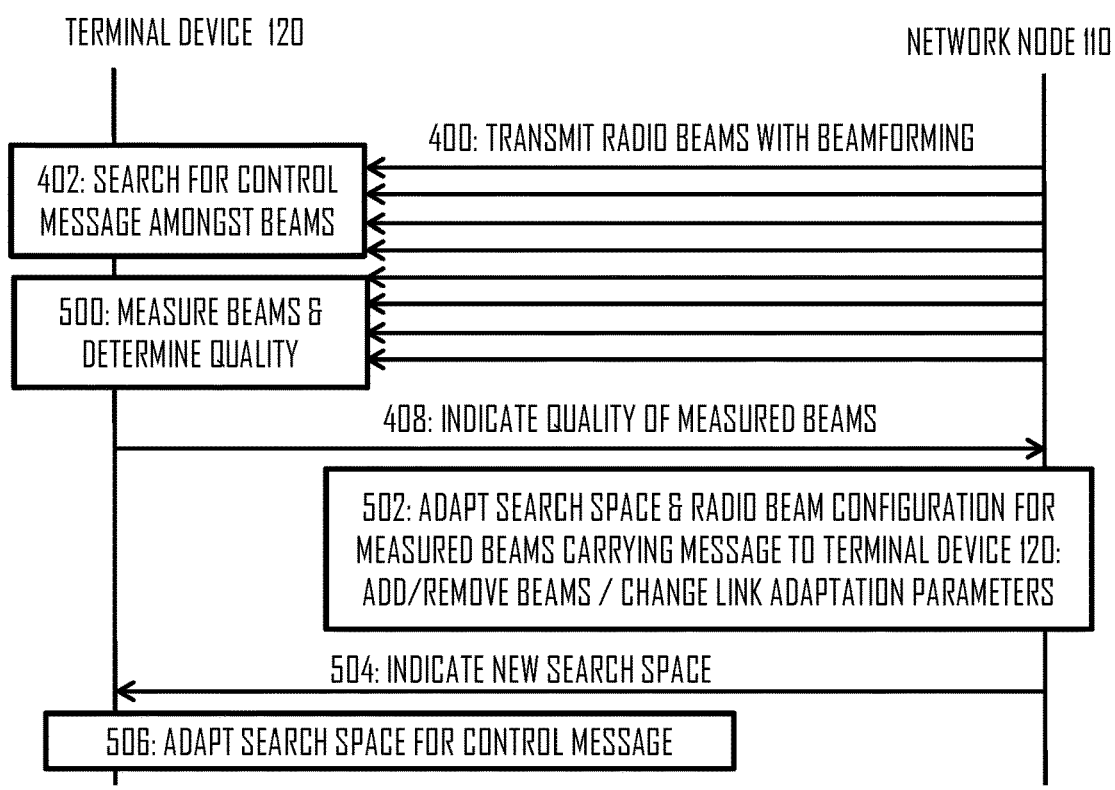

In the embodiment of FIG. 4, the terminal device 120 adapts the search space autonomously on the basis of the measurements. In the embodiment of FIG. 5, the network node assigns the search space to the terminal device. In FIG. 5, the steps or operations denoted by the same reference numbers as in FIG. 4 represent the same or substantially similar operations. Referring to FIG. 5, the network node transmits the radio beams in step 400, and the terminal device measures the beams it is able to receive in block 500. The terminal device 120 may also determine the signal quality for each measured radio beam in block 500. In step 408, the terminal device transmits an uplink control message comprising an information element for at least one radio beam, the information element identifying the corresponding radio beam and the signal quality of the radio beam. The terminal device may send the information element for each radio beam it has measured or a subset of measured radio beams. Upon receiving the information element(s), the network node 110 determines the search space for the terminal device on the basis of the received information element(s). Additionally, the network node may adapt the number of radio beam configurations of the terminal device on the basis of the received information element(s).

In another embodiment of step 408, the terminal device transmits an uplink control message comprising an information element corresponding to the set of radio beams it is able to receive and measure, the information element indicating the common signal quality of the selected radio beams. The common signal quality may be indicated with one signal quality value that indicates the signal quality for a plurality of radio beams. Upon receiving the information element(s), the network node 110 determines the search space for the terminal device on the basis of the received information element(s). Terminal-device may further be configured a reference signal that is used by network node for transmitting control channel from any of the selected radio beams, and used by terminal-device to receive the control channel.

In an embodiment of block 502, the network node may add/remove radio beams to/from the search space and/or adapt link adaptation configurations of each radio beam comprised in the search space. In step 504, the network node transmits a control message to the terminal device, by employing a radio beam configuration mapped to the earlier, currently valid search space of the terminal device. The control message may comprise at least one information element indicating the adapted search space to the terminal device. The control message may be a terminal-device-specific control message indicating the adapted search space only to the terminal device 120, or the control message may be a common control message indicating the adapted search space to the terminal device and to at least one other terminal device, e.g. all terminal devices in the cell 100. Upon receiving and detecting the control message in step 504, the terminal device may adapt the search space to the search space indicated in the received control message. The adapted search space may then be used in the blind detection of the future downlink messages.

In an embodiment of block 502, the network node selects a new radio beam configuration that is comprised in the adapted search space of the terminal device. The control message of step 504 may still be transmitted in the old radio beam configuration, and the new radio beam configuration may be applied after it has been configured to the terminal device 120.

The search space selected in block 406 and 502 may comprise a higher number of scanning configurations than the number of radio beam configurations in which the downlink messages may be transmitted to the terminal device. This may enable fast link adaptation or radio beam selection without a new adaptation of the search space.

Figure 6:
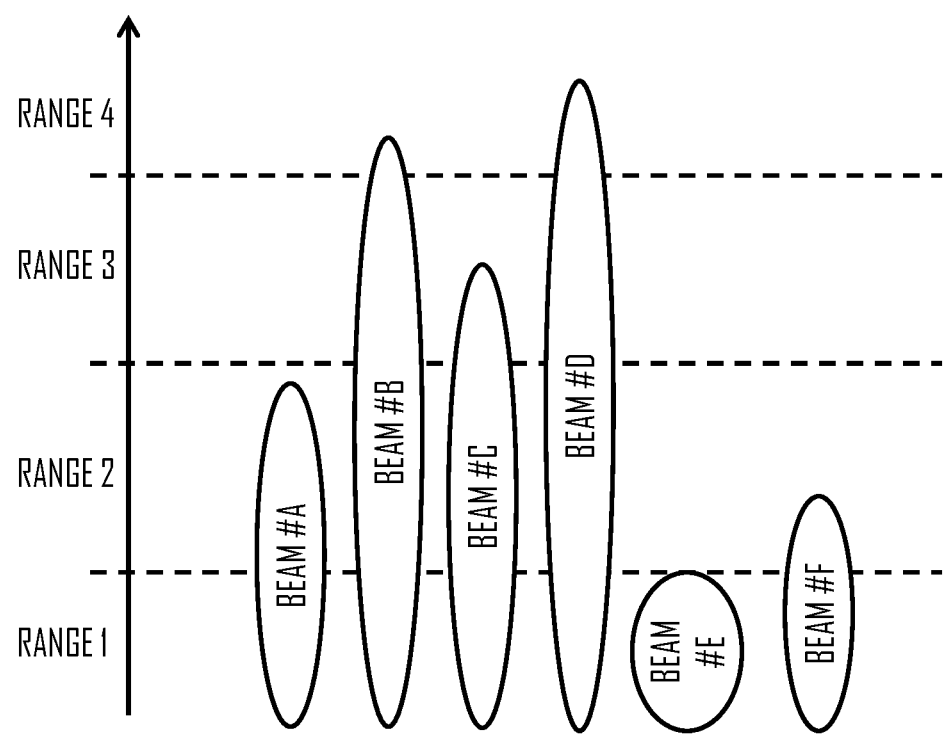
FIG. 6 illustrates a diagram for determining signal qualities of radio beams according to an embodiment of the invention.

Let us now describe the adaptation of the search space to the measured signal quality with reference to FIG. 6. FIG. 6 illustrates a diagram indicating a measured signal quality for a plurality of radio beams #A to #F. The radio beams may be measured and the signal quality determined by the terminal device 120 in block 406 or 500. FIG. 6 classifies the signal quality of a radio beam into one of a plurality of ranges (four ranges in FIG. 4 but the number is exemplary) according to the measurements. The thresholds for the ranges may be preconfigured to the UE or indicated to the UE by the eNB. Range 4 may indicate high signal quality while range 1 may indicate poor signal quality. Accordingly, Beams #B and #D are determined to provide the highest signal quality, while Beam #E is determined to provide the lowest signal quality. The ranges may be mapped to the use of link adaptation configurations in the search space. Table 1 illustrates one example of the mapping, wherein the link adaptation configuration is represented by a modulation and coding scheme (MCS).

TABLE 1

|      | Beam #A | Beam #B | Beam #C | Beam #D | Beam #E | Beam #F |
|------|---------|---------|---------|---------|---------|---------|
| MCS1 | Used    | Used    | Used    | Used    | Used    | Used    |
| MCS2 | Used    | Used    | Used    | Used    | N/A     | Used    |
| MCS3 | N/A     | Used    | Used    | Used    | N/A     | N/A     |
| MCS4 | N/A     | Used    | N/A     | Used    | N/A     | N/A     |

Referring to Table 1, MCS1 may represent a stronger MCS adapted to poor channel conditions while MCS4 may represent a MCS that provides higher data rates but less tolerance against poor channel conditions and noise. MCS1 may be mapped to Range 1, MCS2 to Range 2, MCS3 to range 3, and MCS4 to range 4. In Table 1, "Used" denotes that the corresponding MCS is comprised in the search space for the respective radio beam. As can be seen from Table 1, the MCS mapped to the range to which the signal quality of the radio beam is currently linked is comprised in the search space. Additionally, all the stronger MCSs are also comprised in the search space. For example, all the MCS configurations are comprised in the search space for the high quality radio beams #B and #D. On the other hand, the high data rate MCSs are excluded from the search space for the radio beams determined to provide a poor signal quality. For example, MCS configurations MCS3 and MCS4 are excluded from the search space for the radio beam #A. It may be considered that the correct detection of a message with such a MCS configuration will not be successful when the signal quality is so low.

In an embodiment of Table 1, at lest the MCS configuration MCS1 may be excluded from the search space for the radio beam #B or #D. It may be considered that the network node will try to optimize the amount of transmission resources in the transmission of the messages when the signal quality of a radio beam is high and, therefore, will not employ a MCS configuration that excessively uses the resources. In general, the search space may comprise the link adaptation configuration directly mapped to the signal quality and a determined number of link adaptation configurations that are adjacent to that link adaptation configuration such that at least one link adaptation configuration is excluded from the search space for each radio beam.

As another embodiment related to the adaptation of the search space to the measured signal quality indicated in FIG. 6, the radio beams below a certain threshold may be excluded from the search space. The threshold may be determined in terms of the ranges. For example, radio beams falling to range 1 (#E) may be excluded from the search space.

In case the network node cannot determine the signal quality of the radio beams, e.g. it fails to receive the message in step 408, the network node may employ the strongest link adaptation configuration. Additionally, or alternatively, the network node may maintain the radio beams currently associated with the terminal device.

Figure 7:
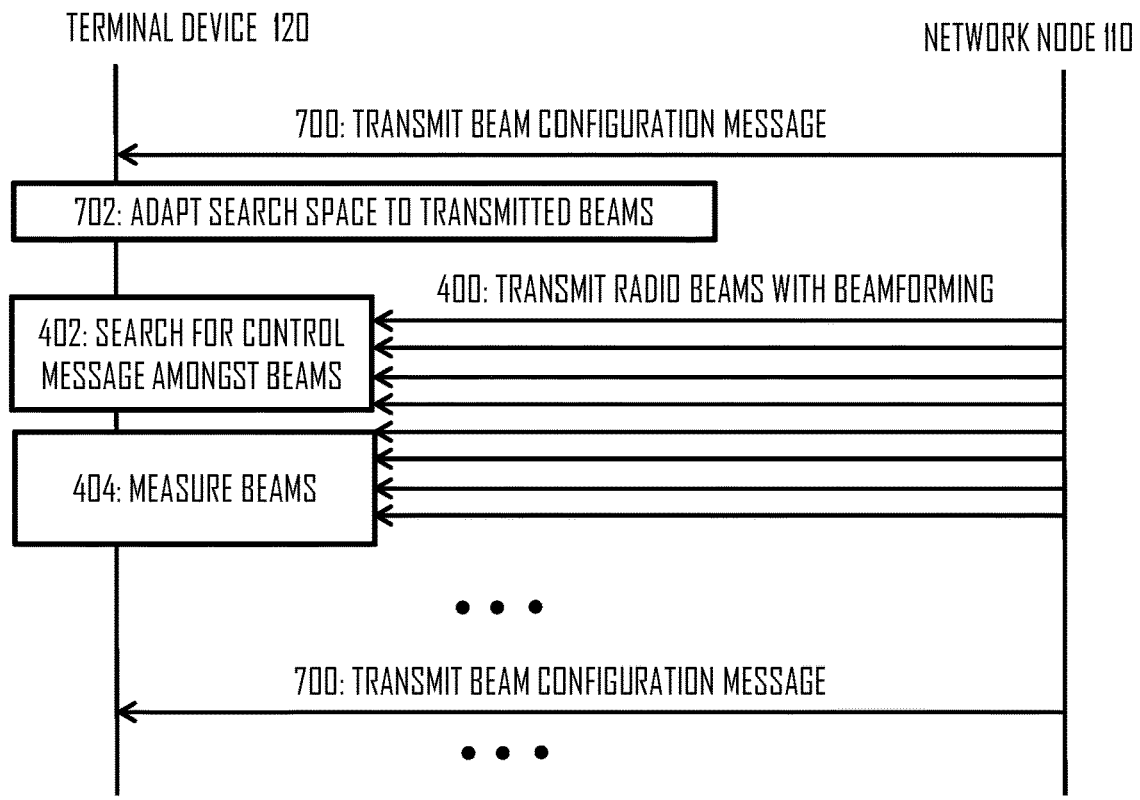
FIG. 7 illustrates a signaling diagram for further adapting the search space of the terminal device according to an embodiment of the invention.

As described above in connection with FIG. 1, the network node 110 may transmit the radio beams in an alternating manner such that only a subset of radio beams are active at a time. Accordingly, the terminal device 120 is not able to detect all the radio beams at any time instant. In more detail, even if a given radio beam was comprised in the search space of the terminal device, the corresponding scanning configuration(s) of the radio beam will not result in the detection of the message if the radio beam is not transmitted. In order to further reduce the search space of the terminal device in such a scenario, the network node may indicate the currently active set of radio beams. FIG. 7 illustrates such an embodiment.

Referring to FIG. 7, the network node 110 may transmit a beam configuration message in step 700. The network node may first determine a set of transmission radio beams for the cell 100, wherein the set of transmission radio beams is a subset of all radio beams supported by the network node. The set of transmission radio beams may be determined for a determined period of time, e.g. for the duration of one or more frames or one or more sub-frames, and a new set of transmission radio beams may be selected for a subsequent period of time. Upon determining the set of transmission radio beams, identifiers of those radio beams may be included in the beam configuration message transmitted in step 700.

In an embodiment, the beam configuration message is transmitted at the beginning of a downlink control channel part of a sub-frame, and it may indicate the active set of transmission radio beams for the sub-frame and, in some embodiments, for one or more subsequent sub-frames. Table 2 below illustrates an embodiment where the network node supports a total of 21 spatially unique radio beams for the cell.

TABLE 2

| Cell Horizontal Angular Domain | | | | | | | |
|---|---|---|---|---|---|---|---|
| Cell Vertical Angular Domain | 1: Yes | 2: No | 3: No | 4: Yes | 5: No | 6: No | 7: No |
| | 8: No | 9: Yes | 10: No | 11: No | 12: No | 13: Yes | 14: No |
| | 15: No | 16: Yes | 17: No | 18: No | 19: Yes | 20: No | 21: No |

The beam configuration message corresponding to Table 2 would indicate to the terminal device that beams 1, 4, 9, 13, 16, and 19 are available for downlink signalling, uplink signalling, and/or data transmission in one or more sub-frames. Table 3 indicates a subsequent configuration for the following sub-frame(s):

TABLE 3

Cell Horizontal Angular Domain

| Cell Vertical Angular Domain | 1: No 8: No 15: Yes | 2: No 9: Yes 16: No | 3: No 10: Yes 17: No | 4: No 11: No 18: No | 5: No 12: Yes 19: No | 6: Yes 13: No 20: No | 7: No 14: Yes 21: No |
|---|---|---|---|---|---|---|---|

Upon receiving the beam configuration message in step 700, the terminal device 120 may adapt the search space to the set of transmission radio beams indicated in the beam configuration message (block 702). For example, the terminal device may remove from the search space at least one radio beam not identified in the beam configuration message. The terminal device may add to the search space a radio beam identified in the beam configuration message. The terminal device may employ a further criterion when considering adding the radio beam to the search space. For example, if the measurements in block 404 indicate that the signal quality of the radio beam is low, the terminal device may determine not to add the radio beam to the search space even if it is being transmitted. If the signal quality of the radio beam is high, the terminal device may determine to add the radio beam to the search space. Then, the process may continue with the search of the control message from the search space in the above-described manner by using the search space adapted in block 702. The search space may be further adapted according to any one of the embodiments described above in connection with FIGS. 4 to 6, e.g. by adapting the link adaptation configurations of the radio beams identified in the beam configuration message and comprised in the search space. When the beam configuration expires, the network node may transmit a new beam configuration message (step 700 at the end of FIG. 7).

In an embodiment, the radio beams supported by the network node may be categorized to primary radio beams and secondary radio beams. The primary beams may be used for basic connectivity such as transmission of a discovery signal or a synchronization signal, and/or radio link monitoring radio resource measurement. The primary radio beams may additionally be used for conveying terminal-device-specific control messages and/or data. The transmission of the primary beams may be scheduled such that the primary beams together cover the whole cell within a determined time interval, e.g. within one time slot or within a few time slots. The secondary radio beams may be used as terminal-device-specific radio beams to improve data rates, for example. They may be scheduled on-a-need basis and the network node may not employ any requirements with respect to their cell-level coverage.

As the terminal device 120 may have a connection with the network node 110 via at least one primary beam, a common search space may be associated with the primary beams. The common search space may be a search space employed by a plurality of terminal devices or even all the terminal devices in the cell 100. The common control messages may be transmitted in primary beams only. Such common control messages may comprise system information, paging information, random access channel responses and/or uplink transmit power control commands. Additionally, a terminal-device-specific search space may be associated with both primary and secondary beams per terminal device.

In an embodiment, the network node transmits the beam configuration message as the common control message. The beam configuration message may have a unique downlink control information (DCI) format with a unique CRC. The network node 110 may choose whether or not to transmit the beam configuration message. Accordingly, the beam configuration may be considered as a courtesy from the network node, and the network node may transmit the beam configuration message only at certain occasions, e.g. when it has excess transmission resources available. The network node 110 may choose the sub-frame or sub-frames in which the beam configuration message is transmitted. Furthermore, the network node may select a radio beam or radio beams that carry the beam configuration message.

The beam configuration message may be used for assisting the terminal device 120 in uplink transmissions. The beam configuration message may, for example, indicate which radio beams are used in a determined uplink transmission opportunity of the terminal device. In an embodiment, the beam configuration message may indicate at least one primary beam as a reception beam at least for at least one uplink control channel such as a physical random access channel (PRACH). The terminal device may measure the downlink primary radio beams and select one or more preferred primary beams for the uplink transmission. Thus, the uplink transmission may be conditioned on the active reception beams and the network node would have the capability to allocate periodical resources for the uplink control channel(s), such as the PRACH. When the uplink transmission opportunity is coming, the network node may signal the active reception beams in the beam configuration message, thus providing the network node with more flexibility with the limited number of available beams. As an example, when the network node receives a scheduling request or an acknowledgment message of an automatic repeat request (ARQ) process from the terminal device, it may allocate a PRACH transmission to another terminal device located in the same direction. Accordingly, multiplexing gain may be achieved.

In an embodiment, the terminal device 120 is configured to adapt a measurement configuration on the basis of the received beam configuration message. The measurement configuration may define radio beams the terminal device measures in block 404 and/or 500, for example. The terminal device 120 may adapt the measurement configuration by including in the measurement configuration only those radio beams that are indicated in the beam configuration message. As a consequence, the terminal device limits measurement to those radio beams that are transmission radio beams.

When the terminal device 120 receives the beam configuration message, it may adapt the search space to include only the transmission radio beams indicated in the beam configuration message. If the search space does not comprise a radio beam carrying a message the terminal device is scanning for in the blind detection, the terminal device may enter a stand-by state or sleep state until receiving a subsequent beam configuration message or for a determined duration.

Figure 8:
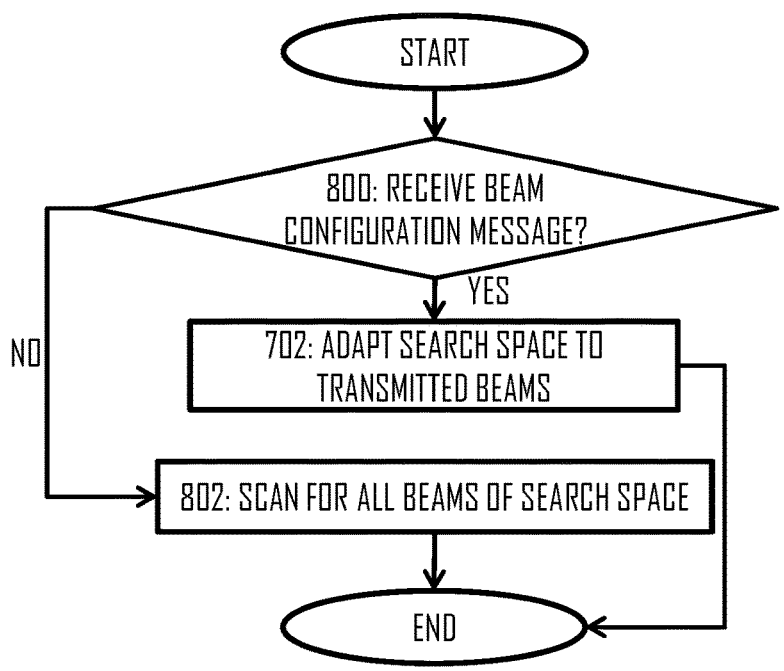
FIG. 8 illustrates a fallback procedure of the terminal device according to an embodiment of the invention.

As described above, the beam configuration message may not always be available or not received in the terminal device 120. In such situations, the terminal device may utilize a fallback procedure illustrated in FIG. 8. Referring to FIG. 8, upon receiving the beam configuration message in block 800, the terminal device may adapt the search space accordingly in block 702, as described above. However, when the contents of the beam configuration message are not available ("NO" in block 800), the process may proceed to block 802 in which the terminal device may include all the radio beams of the cell in the search space. In another embodiment of block 802, the terminal device searching for a determined message may include in the search space all the radio beams designated as candidates for carrying the message. For example, if the terminal device has the knowledge that the message is contained in a radio beam of the first type, it may include in the search space only the radio beams of the first type.

Accordingly, the terminal device may in this embodiment and in any one of the above-described embodiments use a distinct search space for different messages. This enables message-specific configuration of the search space which provides further flexibility in the network node for the allocation and performance gain in the terminal device.

Figure 9:
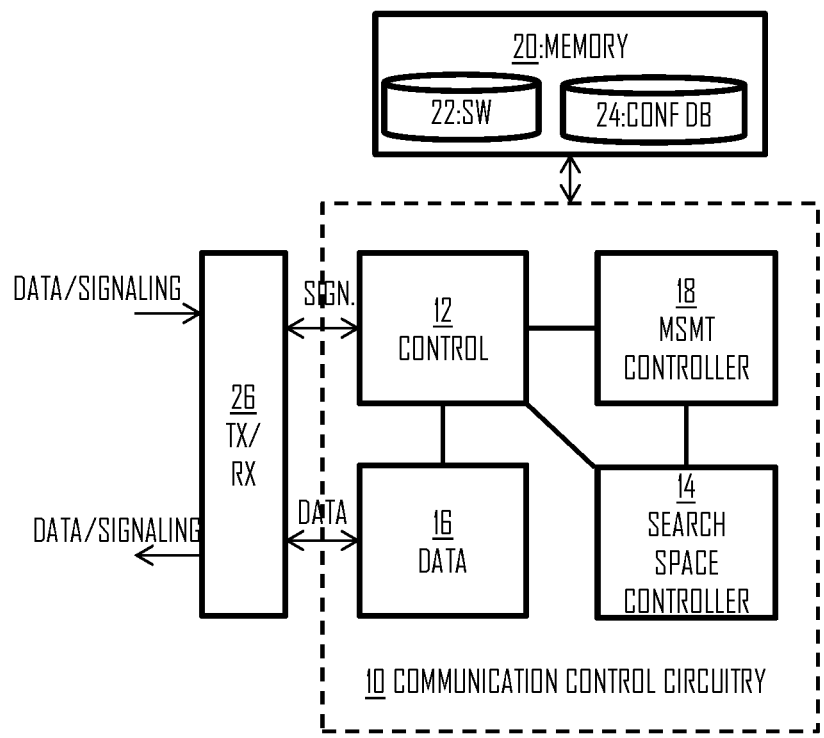
FIGS. 9 to 11 illustrate block diagrams of structures of apparatuses according to some embodiments of the invention.
Figure 10:
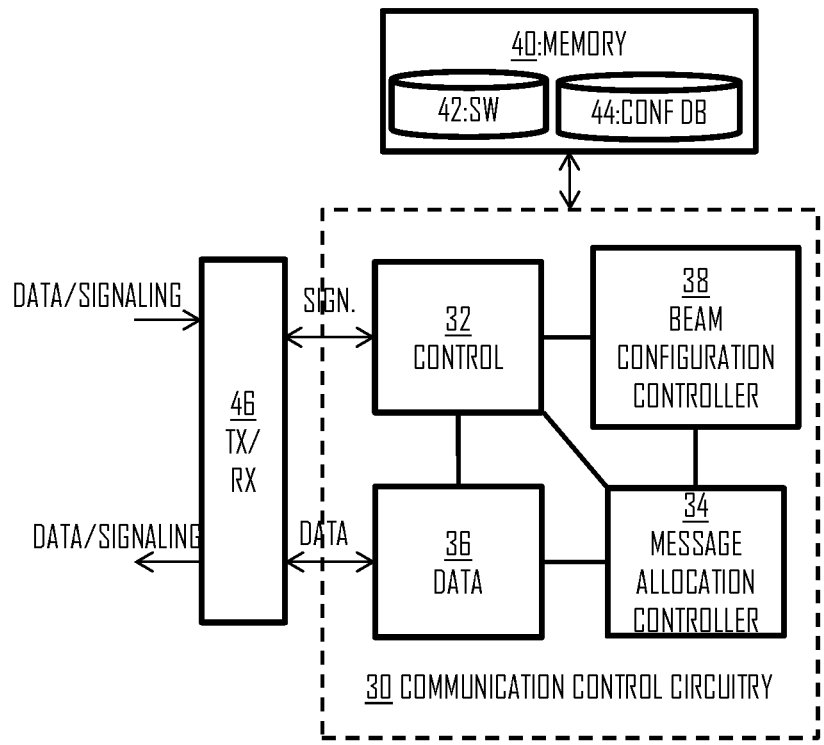
Figure 11:
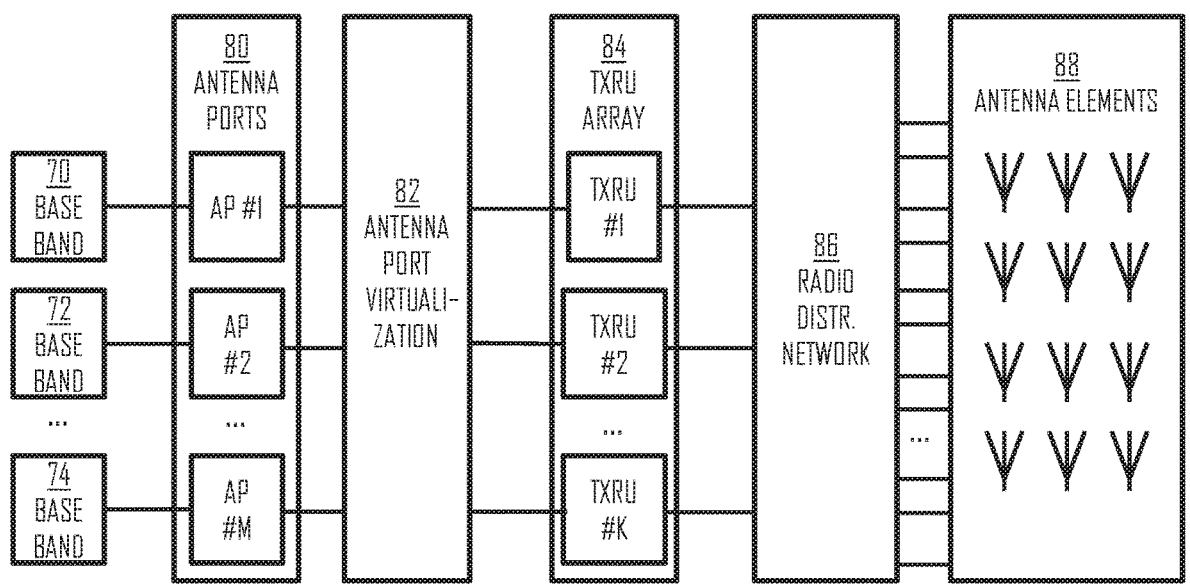

FIGS. 9 to 11 provide apparatuses according to some embodiments of the invention. FIG. 9 illustrates an apparatus configured to carry out the functions described above in connection with the terminal device 120. FIG. 10 illustrates an apparatus configured to carry out the functions described above in connection with the network node 110. Each apparatus may comprises a communication control circuitry 10, 30 such as at least one processor, and at least one memory 20, 40 including a computer program code (software) 22, 42 wherein the at least one memory and the computer program code (software) are configured, with the at least one processor, to cause the apparatus to carry out any one of the embodiments described above in connection with the respective apparatus.

The memories 20, 40 may be implemented using any suitable data storage technology, such as semiconductor based memory devices, flash memory, magnetic memory devices and systems, optical memory devices and systems, fixed memory and removable memory.

The apparatuses may further comprise a communication interface (TX/RX) 26, 46 comprising hardware and/or software for realizing communication connectivity according to one or more communication protocols. The communication interface may provide the apparatus with communication capabilities to communicate in the cellular communication system, e.g. between the network node 110 and the terminal device 120. The communication interface may comprise standard well-known components such as an amplifier, filter, frequency-converter, (de)modulator, and encoder/decoder circuitries and one or more antennas. The communication interface 26, 46 may comprise radio interface components providing the apparatus with radio communication capability in the cellular communication system.

Each memory 20, 40 may store a configuration database 24, 44. The configuration database 24 may store the definitions for one or more search spaces. As described above, a separate search space may be provided for different radio beams and/or different messages, for example. The configuration database 44 may comprise the radio beam configurations of the radio beams transmitted by the network node 110. Each radio beam may have a unique radio beam configuration which defines, for example, a link adaptation configuration and a beamforming configuration for the radio beam.

In an embodiment of FIG. 10, at least some of the functionalities of the network node 110 may be shared between two physically separate devices, forming one operational entity. Therefore, the apparatus may be considered to depict the operational entity comprising one or more physically separate devices for executing at least some of the above-described processes. Thus, the apparatus of FIG. 10, utilizing such a shared architecture, may comprise a remote control unit (RCU), such as a host computer or a server computer, operatively coupled (e.g. via a wireless or wired network) to a remote radio head (RRH) located at a base station site. In an embodiment, at least some of the described processes of the network node may be performed by the RCU. In an embodiment, the execution of at least some of the described processes may be shared among the RRH and the RCU. In such a context, the RCU may comprise the components illustrated in FIG. 10, and the communication interface 46 may provide the RCU with the connection to the RRH. The RRH may then comprise radio frequency signal processing circuitries and antennas, for example.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

Referring to FIG. 9, the apparatus may comprise a control circuitry 12 carrying out control plane signalling with one or more network nodes operating cells in the cellular communication system, e.g. the network node 110. The control circuitry may also carry out any higher level signalling used in communication between the terminal device and the core network 130, e.g. authentication, service requests, and integrity protection. The control circuitry 12 may carry out transmission and reception of control messages in the terminal device. The control circuitry may carry out signalling related to steps 400, 408, 504, 700 in the terminal device 110, for example. The control circuitry may further carry out the above-described scanning for the message(s) from the search space, e.g. blocks 200, 402, 802. The control circuitry may further carry out the above-described measurement of the radio beams, e.g. blocks 202, 404, 500.

The apparatus may further comprise a data communication circuitry 16 configured to carry out transmission and reception of payload data in resources allocated to the terminal device in the cell 100.

The apparatus may further comprise a search space controller 14 configured to manage the above-described search space and to adapt the search space according to any one of the above-described embodiments. For example, the control circuitry 12 may forward contents of the beam configuration message to the search space controller 14, and the search space controller may adapt the search space to comprise or consist of radio beams indicated in the beam configuration message. Then, the search space controller may output the modified search space to the control circuitry 12 for use in the scanning.

The apparatus may further comprise a measurement controller 18 configured to receive measurement results associated with the measured radio beams from the control circuitry 18. The measurement controller 18 may map the measurement results to signal quality values, as described above. The measurement controller may output the signal quality values of the measured radio beams to the search space controller 14, and the search space controller may adapt the search space on the basis of the signal quality values, as described above in connection with block 406. The measurement controller 18 may also instruct the control circuitry 12 to transmit a measurement report to the network node, the measurement report comprising an information element identifying a measured radio beam and associated signal quality. A corresponding information element may be provided for each measured radio beam in the measurement report. When the apparatus operates according to the embodiment of FIG. 5, the control circuitry 12 forwards the contents of the message received in step 504 to the search space controller, and the search space controller performs block 506 as a response to the message.

Referring to FIG. 10, the apparatus may comprise a control circuitry 32 carrying out control plane signalling with terminal devices, other network nodes of a radio access network of the cellular communication system, and with network nodes of the core network 130. The control circuitry 32 may carry out transmission and reception of control messages in the cell 100. The control circuitry may also carry out signalling related to steps 400, 408, 504, 700 in the network node 110, for example.

The apparatus may further comprise a data communication circuitry 36 configured to carry out transmission and reception of payload data with terminal devices in the cell 100.

The apparatus may further comprise a beam configuration controller 38 configured to carry out scheduling of radio beams having different beamforming configurations. The beamforming configuration may define the spatial filtering of each radio beam and, thus, define the coverage area of each beam. The beamforming configuration of a radio beam may be comprised in the radio beam configuration of the beam among other parameters such as the link adaptation configuration, for example. The beam configuration controller may schedule transmission timings of each beam. The beam configuration controller may generate the beam configuration message on the basis of the scheduled transmission timings and cause the control circuitry 32 to transmit the beam configuration message and the radio beams according to the schedule.

The apparatus may further comprise a message allocation controller 34 configured to receive the schedule from the beam configuration controller and to allocate messages or transmission resources of the terminal device 120 (and other terminal devices in the cell 100) to the radio beams on the basis of the schedule. The message allocation controller may in some embodiments further receive the measurement reports and determine the link adaptation parameters for a message addressed to the terminal device on the basis of a measurement report received from the terminal device. The message allocation controller may allocate uplink transmission resources to the terminal devices on the basis of the received measurement reports.

When the apparatus operates according to the embodiment of FIG. 5, the apparatus may further comprise a search space controller configured to determine the search spaces for the terminal devices on the basis of the received measurement reports, as described in connection with FIG. 5.

The modules 12 to 18 of the communication control circuitry 10 and the modules 32 to 38 of the communication control circuitry 30 may be considered as sub-circuitries of the respective communication control circuitry. They may be considered as operational modules realized by the same physical circuitry, or each module may be realized by a distinct physical circuitry. In some embodiments, each module may be considered as a computer program module defined by a dedicated computer program code.

FIG. 11 illustrates an embodiment of a transceiver architecture of the network node 110. As described above, the network node may employ the beamforming in the transmission of radio beams, and the beamforming may be realized by using an antenna array 88 comprising a plurality of antenna elements. In some embodiments, the number of antenna elements may be more than four, more than eight, more than 12, more than 20, more than 100, or even more than 1000. With a higher number of antenna elements, higher directivity of radio beams may be achieved. Additionally, spectral efficiency may be considered to have a relationship with the number of spatial streams the network node can support. The higher number of spatial streams results in higher spectral efficiency. Referring to FIG. 11, baseband modules 70, 72, 74 may perform baseband signal processing including modulation, channel coding, etc. for each radio beam. The number of baseband modules 72 to 76 may correspond to the number of transmitted radio beams, e.g., M. Each baseband module may be connected to a respective antenna port (AP) 80. Block 82 performs antenna port virtualization which may be described as mapping between the antenna ports 80 and transceiver units (TXRU) 84. In one implementation, each antenna port is mapped to one transceiver unit (TXRU) 84, e.g., one-to-one mapping. In another implementation, one antenna port may be connected to a plurality of transceiver units. The number of transceiver units may be K, and in an embodiment K=M while in another embodiment K≠M.

A transceiver unit 84 may comprise a digital-to-analog (D/A) converter in a transmitter chain and an analog-to-digital converter in a receiver chain. Accordingly, the transceiver unit may be the cut-off point for the above-described virtualization of signal processing operations. For example, the baseband modules, the antenna ports, and the antenna port virtualization may be carried out by the RCU, or some of them may be realized in the RRH. The transceiver unit may further comprise analog components conventionally used in a radio transceiver. Such components may include in the transmitter chain a frequency-converter, a power amplifier, a radio frequency filter. Such components may include in the receiver chain a low-noise amplifier, a radio frequency filter, and a frequency converter.

The transceiver units of the transceiver array 84 are connected to a radio distribution network 86 configured to perform the antenna virtualization in a radio frequency domain. The radio distribution network may then connect to L antenna elements 88. The radio distribution network 86 together with the antenna port virtualization 82 and/or the baseband modules may define a beamforming architecture of the transceiver structure and the network node. The beamforming may be realized by using digital signal processing techniques, analog signal processing techniques, or a hybrid of analogue and digital signal processing. In the digital beamforming, each transceiver unit may be connected to one antenna element, and the beamforming may be realized through digital pre-coding in which assigns an appropriate weight to each transmission/reception stream (M streams in the embodiment of FIG. 11). In the analog beamforming, the radio distribution network maps a signal from a transceiver unit to a plurality of antenna elements and controls amplification and phase of the signals applied differently such that the constructive and destructive interference of the signal emitted from the different antenna elements is achieved in the desired manner. In the hybrid solution, both analog and digital beamforming technique is employed, e.g. a part of the beamforming may be realized in the digital domain and another part in the analog domain.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 8 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 8 or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2 to 8 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method, comprising in a terminal device:
  scanning for at least one message amongst a plurality of radio beams in a cell according to a search space defining a plurality of scanning configurations;
  measuring a signal quality of at least one radio beam in the cell;
  adapting the search space on the basis of the measured signal quality; and
  performing said scanning for the at least one message according to the adapted search space.

2. The method of claim 1, further comprising:
  causing transmission of a message identifying the at least one radio beam and comprising an information element indicating the signal quality for the at least one measured radio beam.

3. The method of claim 1, wherein said adapting the search space comprises at least one of:
  removing at least one link adaptation parameter configuration of at least one radio beam from the search space, and
  removing at least one radio beam from the search space.

4. The method of claim 1, further comprising:
  receiving, from a network node operating said cell, a beam configuration message identifying at least one radio beam transmitted in the cell; and adapting the search space on the basis of the beam configuration message by removing from the search space at least one radio beam not identified in the beam configuration message.

5. An apparatus comprising:
at least one processor, and
at least one memory comprising a computer program code, wherein the processor, the memory, and the computer program code are configured to cause the apparatus to:
scan for at least one message amongst a plurality of radio beams in a cell according to a search space defining a plurality of scanning configurations;
measure a signal quality of at least one radio beam in the cell;
adapt the search space on the basis of the measured signal quality; and
perform said scanning for the at least one message according to the adapted search space.

6. The apparatus of claim 5, wherein the processor, the memory, and the computer program code are configured to cause the apparatus to cause transmission of a message identifying the at least one measured radio beam and comprising an information element indicating the signal quality for the at least one measured radio beam.

7. The apparatus of claim 5, wherein the processor, the memory, and the computer program code are configured to cause the apparatus to adapt the search space by removing at least one link adaptation parameter configuration of at least one radio beam from the search space.

8. The apparatus of claim 7, wherein said removing comprises removing at least one modulation-and-coding-scheme configuration of at least one radio beam from the search space.

9. The apparatus of claim 5, wherein the processor, the memory, and the computer program code are configured to cause the apparatus to adapt the search space by removing at least one radio beam from the search space.

10. The apparatus of claim 5, wherein the processor, the memory, and the computer program code are configured to cause the apparatus to:
receive, from a network node operating said cell, a beam configuration message identifying at least one radio beam transmitted in the cell; and
adapt the search space on the basis of the beam configuration message by removing from the search space at least one radio beam not identified in the beam configuration message.

11. The apparatus of claim 10, wherein the processor, the memory, and the computer program code are configured to cause the apparatus to:
determine a candidate beam set for the apparatus;
compare the candidate beam set with the at least one radio beam transmitted in the cell identified in the beam configuration message; and
upon detecting that at least one radio beam in the beam configuration message is not present in the candidate beam set, removing from the search space the corresponding at least one radio beam.

12. An apparatus comprising:
at least one processor, and
at least one memory comprising a computer program code, wherein the processor, the memory, and the computer program code are configured to cause the apparatus to:
cause transmission of a plurality of radio beams in a cell according to a plurality of different beamforming configurations;
acquire a message originating from a terminal device, identifying at least one of the plurality of radio beams, and comprising an information element indicating channel quality for each of the identified at least one of the plurality of radio beams;
adapt, on the basis of the received information element, at least one radio beam configuration associated with the terminal device; and
cause transmission of a message to the terminal device according to the adapted radio beam configuration.

13. The apparatus of claim 12, wherein the processor, the memory, and the computer program code are configured to cause the apparatus to adapt the at least one radio beam configuration by adapting a link adaptation parameter configuration of a radio beam.

14. The apparatus of claim 13, wherein the processor, the memory, and the computer program code are configured to cause the apparatus to adapt the link adaptation parameter configuration by adapting at least one modulation-and-coding-scheme configuration of the radio beam.

15. The apparatus of claim 12, wherein the processor, the memory, and the computer program code are configured to cause the apparatus to adapt the at least one radio beam configuration by removing a radio beam from a set of radio beams to which the apparatus allocates messages addressed to the terminal device.

16. The apparatus of claim 12, wherein the processor, the memory, and the computer program code are configured to cause the apparatus to:
determine a set of transmission radio beams for the cell, wherein the set of transmission radio beams is a subset of all radio beams supported by the apparatus; and
cause transmission of a beam configuration message identifying the transmission radio beams comprised in the set.

17. The apparatus of claim 16, wherein the beam configuration message identifies the transmission radio beams that each carry messages to a plurality of terminal devices.

18. The apparatus of claim 16, wherein the beam configuration message identifies the transmission radio beams for a limited time period.

19. The apparatus of claim 12, wherein the message comprises a downlink control message.

20. The apparatus of claim 12, further comprising a communication interface comprising hardware providing the apparatus with radio communication capability in a cellular communication system.

* * * * *